United States Patent [19]

Kortschot et al.

[11] Patent Number: 5,555,796
[45] Date of Patent: Sep. 17, 1996

[54] APPARATUS FOR HEATING OF BULK MATERIALS

[75] Inventors: Cornelis Kortschot, Cambridge; Lowell D. Knieriem, Milton, both of Canada

[73] Assignee: Research Applications Inc., Cambridge, Canada

[21] Appl. No.: 281,619

[22] Filed: Jul. 28, 1994

[30] Foreign Application Priority Data

Jul. 28, 1993 [GB] Great Britain ......................... 9315592

[51] Int. Cl.⁶ ............................. A23C 7/00; B01F 9/00; B01F 15/06
[52] U.S. Cl. .................... 99/453; 62/342; 99/348; 99/483; 165/92; 165/109.1; 366/144; 366/147; 366/225; 366/231
[58] Field of Search .................. 99/348, 483, 452, 99/453–455; 366/230, 231, 144–146, 147, 224, 225, 222, 223; 165/92, 109.1, 85, 87; 62/342, 343, 346

[56] References Cited

U.S. PATENT DOCUMENTS

| | | | |
|---|---|---|---|
| 781,382 | 1/1905 | Valerius | 165/92 |
| 1,436,307 | 11/1922 | Drucker | 366/231 |
| 1,948,280 | 2/1934 | Schildman | 165/92 |
| 2,083,837 | 6/1937 | Goecke | 165/92 |
| 2,577,916 | 12/1951 | Rollman | 366/223 |
| 3,369,596 | 2/1968 | Maeland | 165/109.1 |
| 3,546,430 | 12/1970 | Kane | 165/109.1 |
| 3,739,710 | 6/1973 | Costa et al. | 99/348 |
| 3,787,035 | 1/1974 | Bryson, Jr. et al. | 366/232 |
| 3,952,538 | 4/1976 | Warlick | 62/342 |
| 4,166,705 | 9/1979 | Fronske | 366/224 |
| 4,233,676 | 11/1980 | Lucke et al. | 366/147 |
| 4,893,939 | 1/1990 | Burk et al. | 366/224 |
| 5,236,263 | 8/1993 | Friedland | 366/222 |

FOREIGN PATENT DOCUMENTS

1592799   7/1981   United Kingdom .

Primary Examiner—Timothy F. Simone
Attorney, Agent, or Firm—R. Craig Armstrong

[57] ABSTRACT

Heat is applied to a solid or semi-solid material in a cylindrical container in such a way that a precise, predetermined amount of heat is transferred to a horizontal layer of the material until it softens sufficiently to allow the heating element to sink into the material where it will heat the next layer. The container is rotated about a vertical axis, and a horizontally-oriented heating element is lowered into contact with the material to apply heat to a horizontal layer. The heating element is lowered through the material in a controlled manner to heat progressively lower layers within the container, until the whole container has been heated. The heating element may be heated by pumping hot water therethrough, or by other means. A container of hot liquid may be cooled in a similar fashion, by gradually raising a cooling element from the bottom of the container.

12 Claims, 13 Drawing Sheets

APPARATUS FOR HEATING OF BULK MATERIALS

BACKGROUND OF THE INVENTION

1. Field of the Invention

This invention relates to a method and apparatus for heating bulk materials in a drum.

Many materials that are shipped in pails or drums solidify during storage and/or shipping and must be melted or at least liquified, before they can be removed from their containers.

Examples are lards, butter and margarine, shortenings and hydrogenated vegetable oils, peanut butter, chocolate coatings and other fat-based confectionery materials. Waxes and heavy oils and gels are other examples of materials that require heating before they can be pumped from their shipping containers.

There are also a number of products that must be stored and shipped in a chilled or frozen form in order to preserve them. Examples are fruit purees, juices, fruit and vegetable concentrates and liquid eggs.

Some products will become semi-solids during storage because one or more of the components crystallizes. Examples are chocolate coatings, honey and syrups that contain blends of different sugars.

In all of the examples mentioned above, it is necessary to melt, soften or re-dissolve the materials before they can be pumped from their containers and used in further processing.

2. Description of the Prior Art

One common method, used in the food industry, is to place the containers in a heated room at a temperature as high as 140° F. and allow them to melt or thaw over a period of several days. A number of "hot boxes" that heat four or eight drums at a time, are regularly advertised in the trade papers. These treatments will cause local overheating, due to the fact that the contents are not agitated and heat has to penetrate from the outside to the interior. There are dangers that spoilage or heat-induced deterioration will occur before the whole container is liquified.

Another method is to use a so-called drum heater. This is an electrically heated collar that is clamped around the container, commonly a steel drum. This method can cause severe local overheating that can have deleterious effects on the quality of the material. The process is slow and the collar should be moved a number of times to melt different sections in the drum. There is no agitation during the melting process.

SUMMARY OF THE INVENTION

It is an object of the invention to provide a method and apparatus for heating bulk materials in a drum in such a way as to overcome the above-mentioned problems.

In the method of the invention, heat is applied to a solid or semi-solid material in bulk cylindrical containers in such a way that a precise, predetermined amount of heat is transferred to a horizontal layer of the material until it softens sufficiently to allow the heating element to sink into the material where it will heat the next layer.

The apparatus of the invention includes a turntable that is used to rotate the container, and a heating element that is designed to move in vertical directions at controlled speeds. The bulk material, typically contained in a pail, drum or small cylindrical tank, is secured to the turntable and is rotated via rotation of the turntable so that the heating element also becomes an agitator. By rotating the material instead of the heating element, the element is stationary, except for its vertical movement. Connections to channels within the element that carry heating or cooling media are thus not rotating, and present no special design problems. Mixing or scraper blades can be added, a secondary heating or cooling element can be added, other ingredients can be introduced, or a second processor such as a high speed emulsifier can be mounted to further process the material, in the same container in which the product arrives at the factory.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENT

The inventors have recognized that in order to raise the temperature of materials in bulk containers with thermal energy, it is necessary to provide agitation if heating is to be accomplished within a reasonable time. When the material is a solid or semi-solid it is however not possible to agitate the contents until the softening or melting process has been completed.

The inventors have developed a process and built the equipment that can gently heat a solid or semi solid product either a few degrees or completely melt it, without local overheating any portion of the material. A fifty gallon drum of a shortening can be partially melted or completely liquified by raising the temperature 20 to 30 degrees and be ready for pumping out in a period as short as ten minutes.

The principle that is employed is simple and analogous to moving a hot knife through butter. The heating element is typically a vertical pipe with two or more pipes in the form of a cross, in a horizontal plane, at the end. These pipes contain internal channels to guide hot water down the vertical pipe, to the ends of the cross members and return it up the vertical pipe. An option that is not shown in the accompanying drawings is to provide a cooling or insulating jacket on the outer channel in the vertical leg of the heating element to completely confine heating to the area of the cross members.

In order to have complete freedom in the design of the heating/mixing element (the hot knife), the cylindrical container is secured on a turntable that is an integral part of the equipment and is rotated at 12 to 20 r.p.m. The heating element is stationary but it is attached with an arrangement of guide rollers to a vertical mast so that it can be moved up and down. The up and down movement can be accomplished in a number of ways, for instance by a piston that is operated with compressed air, or by rotating a threaded rod in a fixed threaded collar or nut to lengthen or shorten the part of the rod above the collar.

In operating this equipment, the heating element is fully raised and a drum is placed on the turntable. Hot water or another heat exchange medium is pumped through the heating element and the element is then lowered at a slow, controlled rate into the material in the drum. Heat is transferred uniformly to the top layer of material and this completely or partially melts the material. As the material is liquified, the heating/mixing element is allowed to sink into the drum. The heating zone is confined to the horizontal plane of the heating element and the material is heated only at the time that it is in contact with this part of the element. After the hot section of the element has passed, no further heat exchange takes place.

The leg that supports the element can be used to further mix the liquified material by means of blades attached to the vertical leg.

Figure 16:
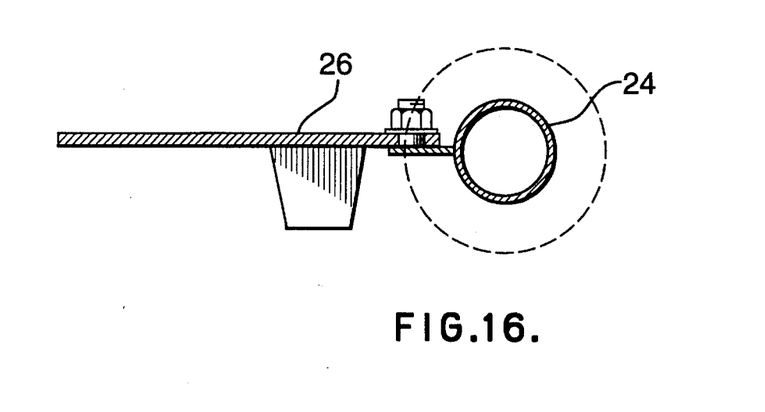
FIG. 16 is a side cross-sectional view showing the scraper.

Many drums have a rim with an internal diameter that is somewhat smaller than the internal diameter of the walls of the drum. For this reason the arms of the heating element will not be long enough to reach the walls if they are to pass through the rim. A scraper 26 removes material from the walls. This scraper is attached to the end of one of the arms of the heating element by a hinge pin and is shaped like a curved plough. The curvature of the plough moves the scraper against the wall when it is pushed through the viscous material. A blade section that is also a part of this scraper then moves material from the wall into the path of the heating elements.

EXAMPLE

A 500 pound drum of chocolate coating in paste form at a temperature between approximately 60° and 78° F. is placed on the platform 1 that is supported by the fixed casters 2 and rotated by means of sprocket 3, chain 4 and motor 5, at about 20 r.p.m. A steel band 27 attached to the platform is clamped around the drum to hold it in place.

Figure 9:
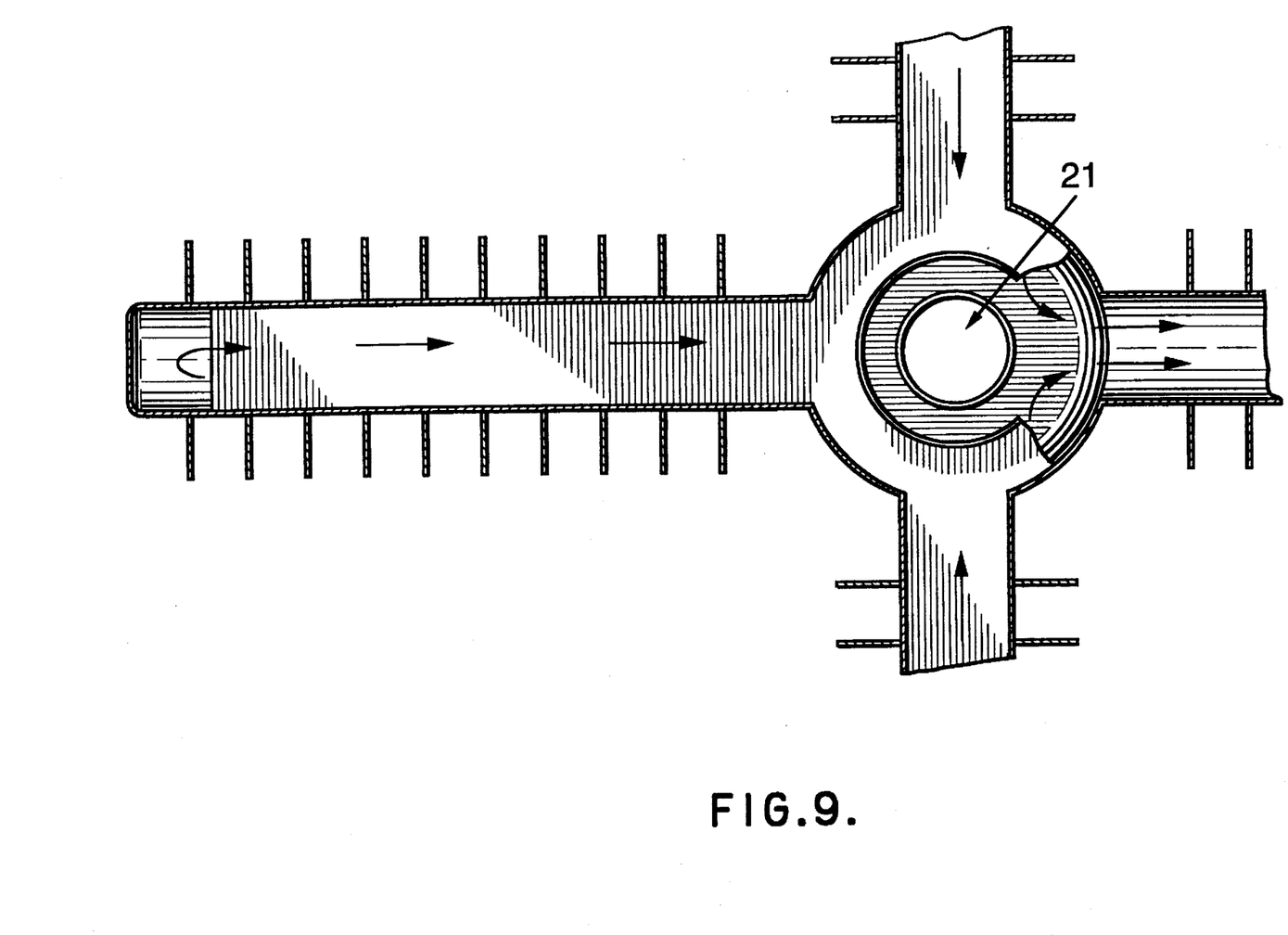
FIG. 9 is horizontal cross-section of the heating element.
Figure 10:
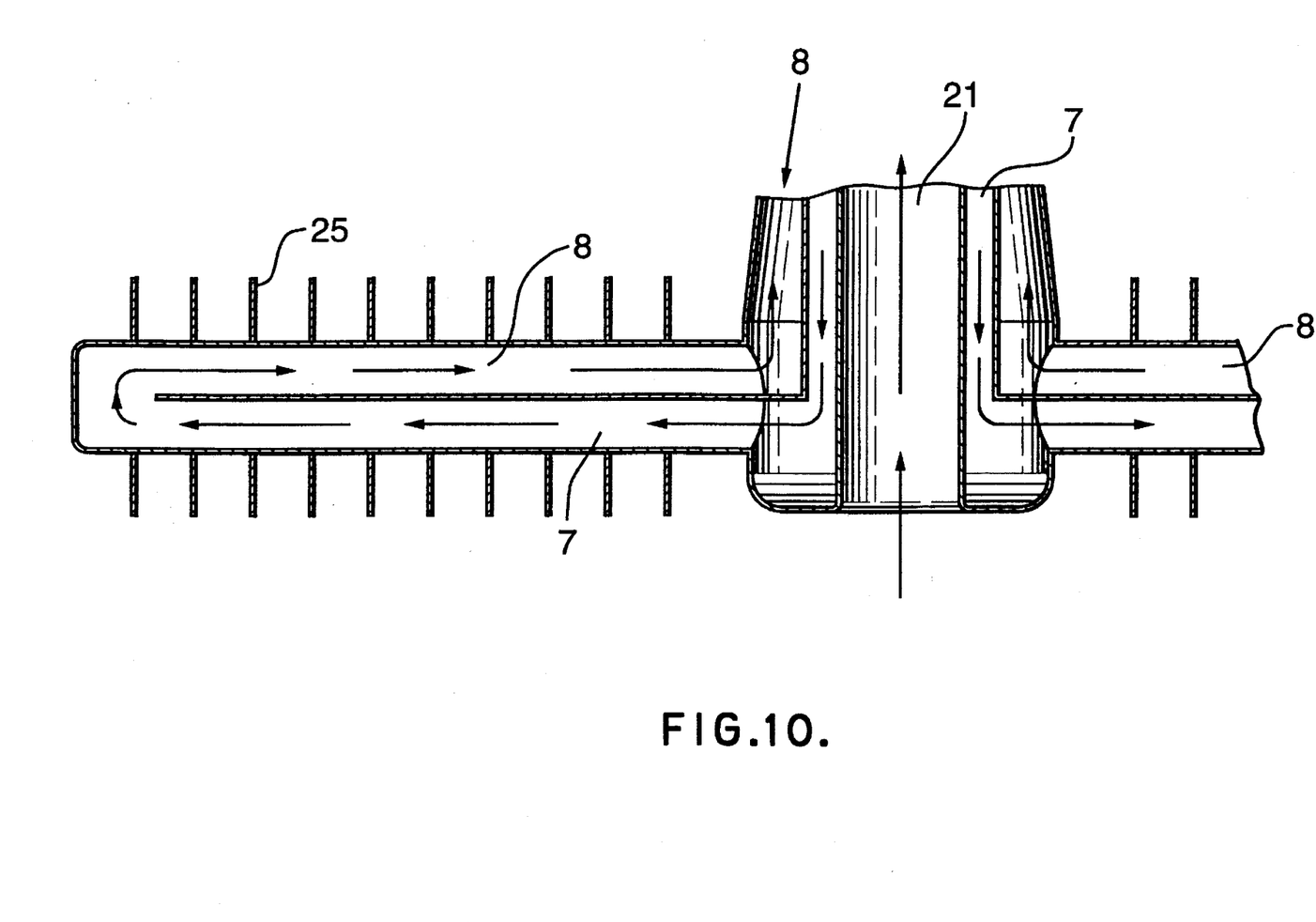
FIG. 10 is a side cross-section of the heating element.

Water at 140° F. is supplied to the heating element through inlet 6 and this heated water travels through channel 7 to the end of the arms of the heating element and then returns through channel 8 to the outlet 9. The hot water is supplied by an external water heater that has a pump to circulate the water through the heating element.

Figure 11:
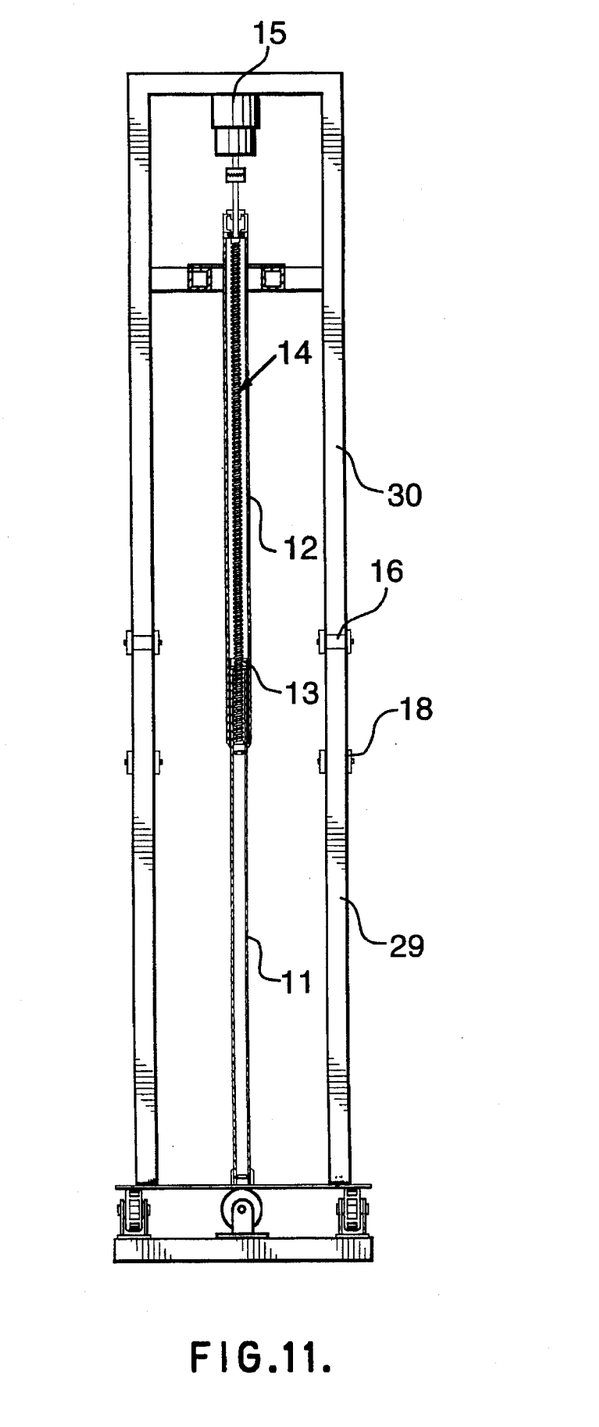
FIG. 11 is a front view of the moveable frame.
Figure 12:
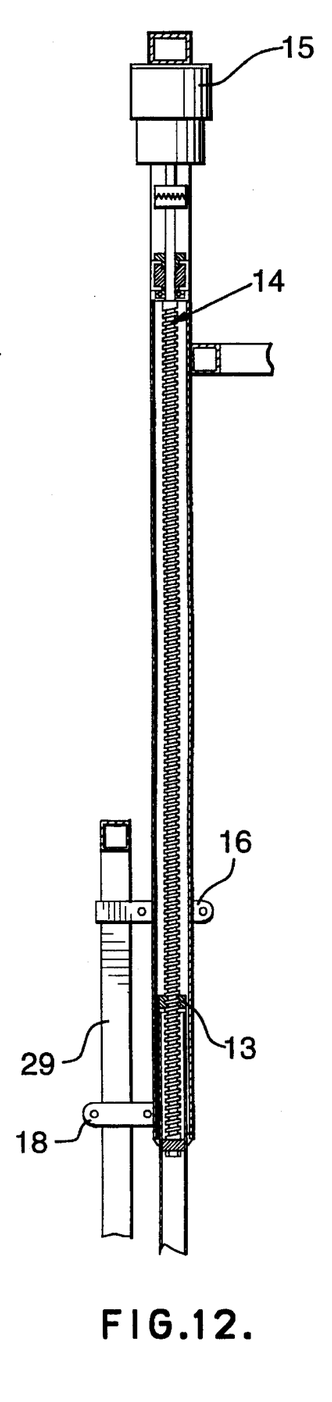
FIG. 12 is a cross-sectional elevation view of the threaded rod.
Figure 13:
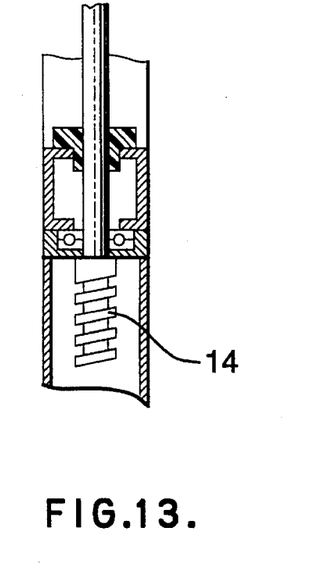
FIG. 13 is a close-up of an upper area of FIG. 12.
Figure 14:
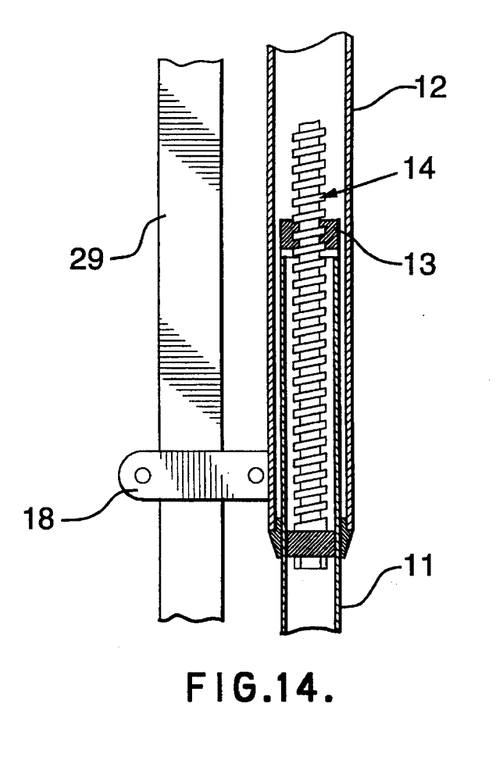
FIG. 14 is a close-up of a lower area of FIG. 12.

The heating elements of 24, together with the vertical leg 10, are attached to the movable part of the lift assembly. This lift assembly consists of a fixed frame 29 and a movable frame 30, and the drive mechanism that consists of two concentric pipes, namely a lower internal, fixed section 11 and a top, outer moving section 12. The upper end of the lower section is a threaded insert 13, and a threaded rod 14 that can be rotated by electric motor drive 15. This rod determines the total length of the two sections, by telescoping the two sections over each other, thereby raising or lowering the whole lift assembly, including the movable section of the mast, the electric drive, the connecting brace and the vertical and horizontal parts of the heating element.

Figure 1:
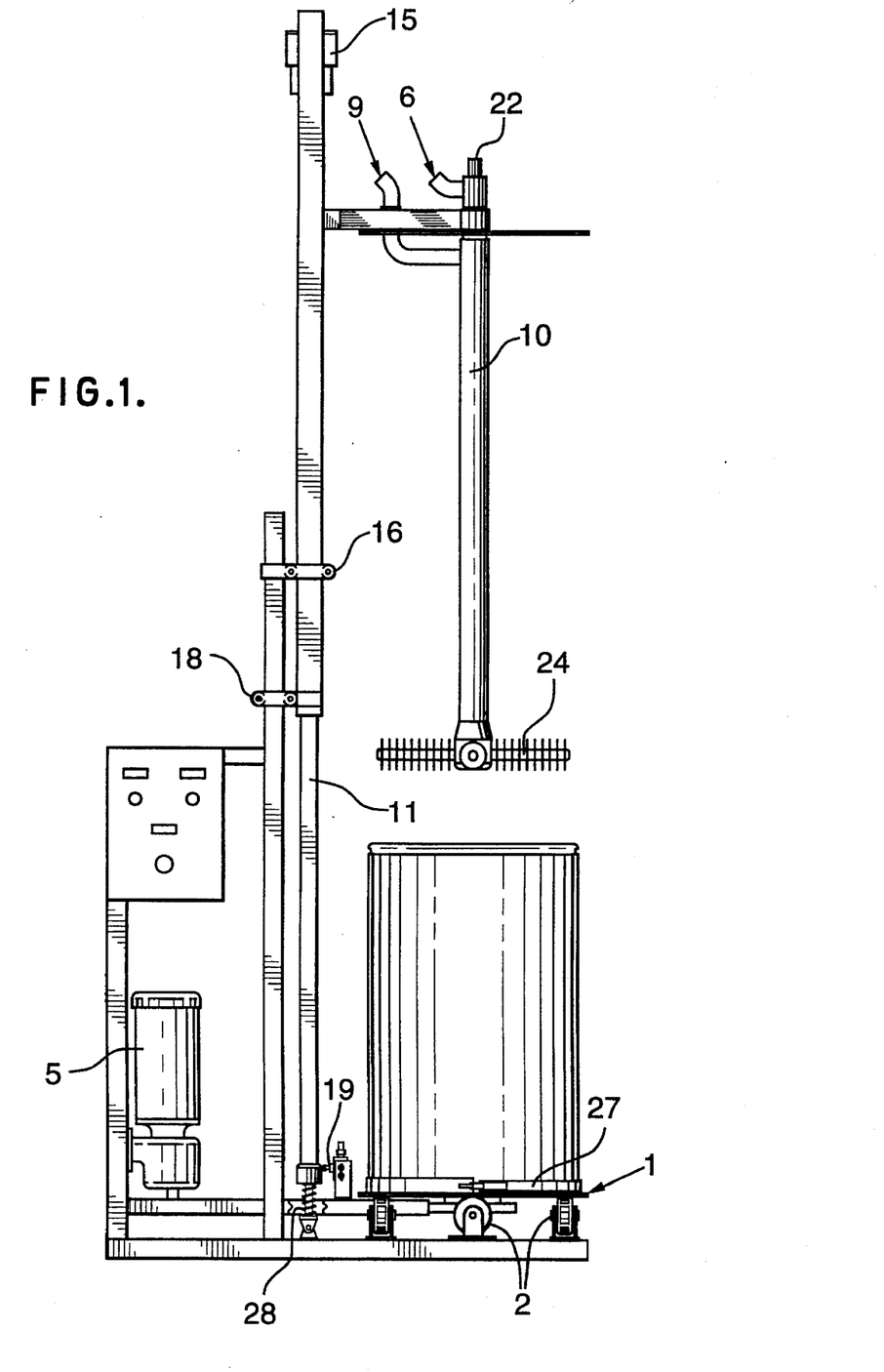
FIG. 1 is a side elevation view of the apparatus, shown with a barrel or drum of material.
Figure 2:
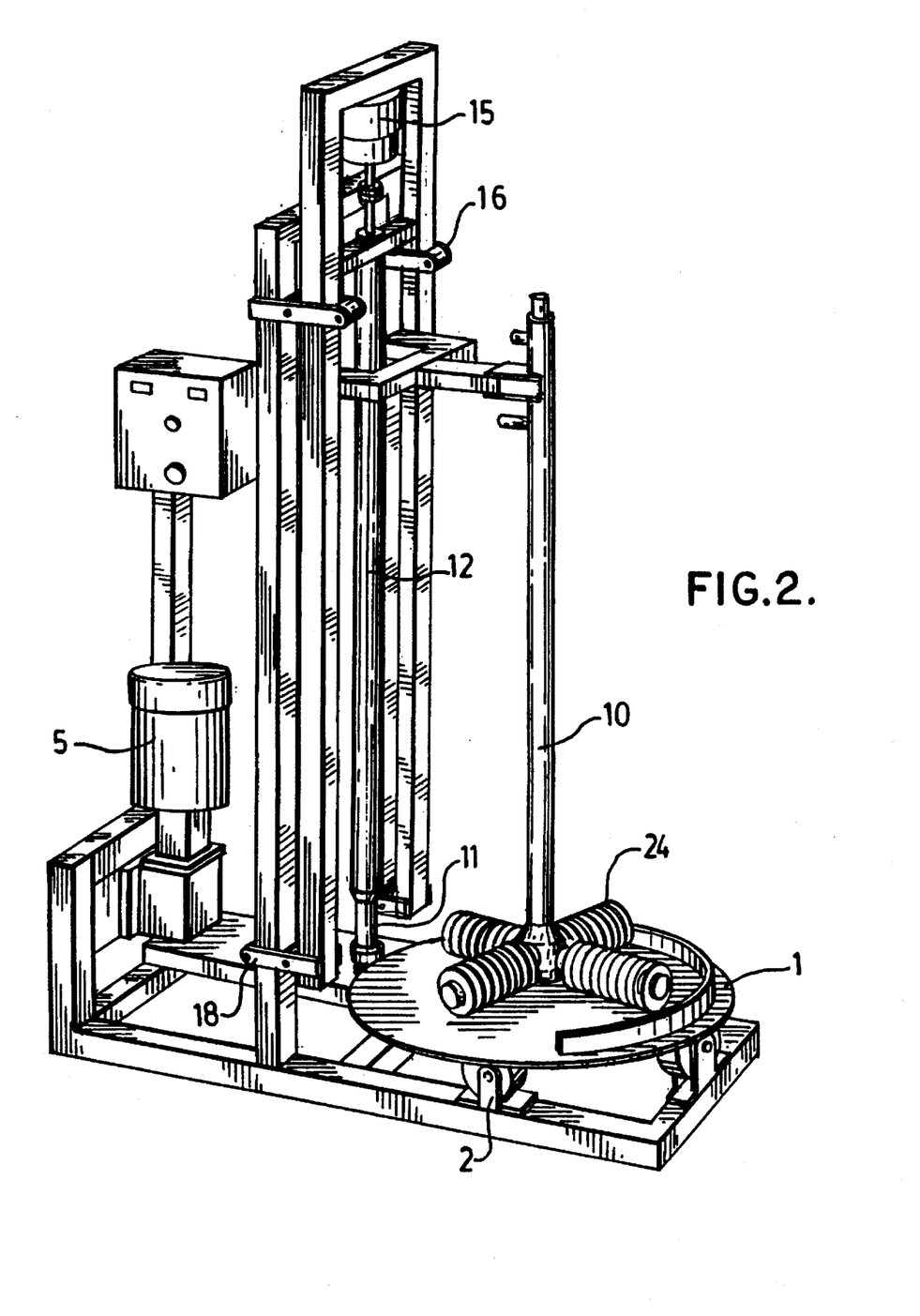
FIG. 2 is a perspective view of the apparatus, shown without a barrel or drum of material.
Figure 3:
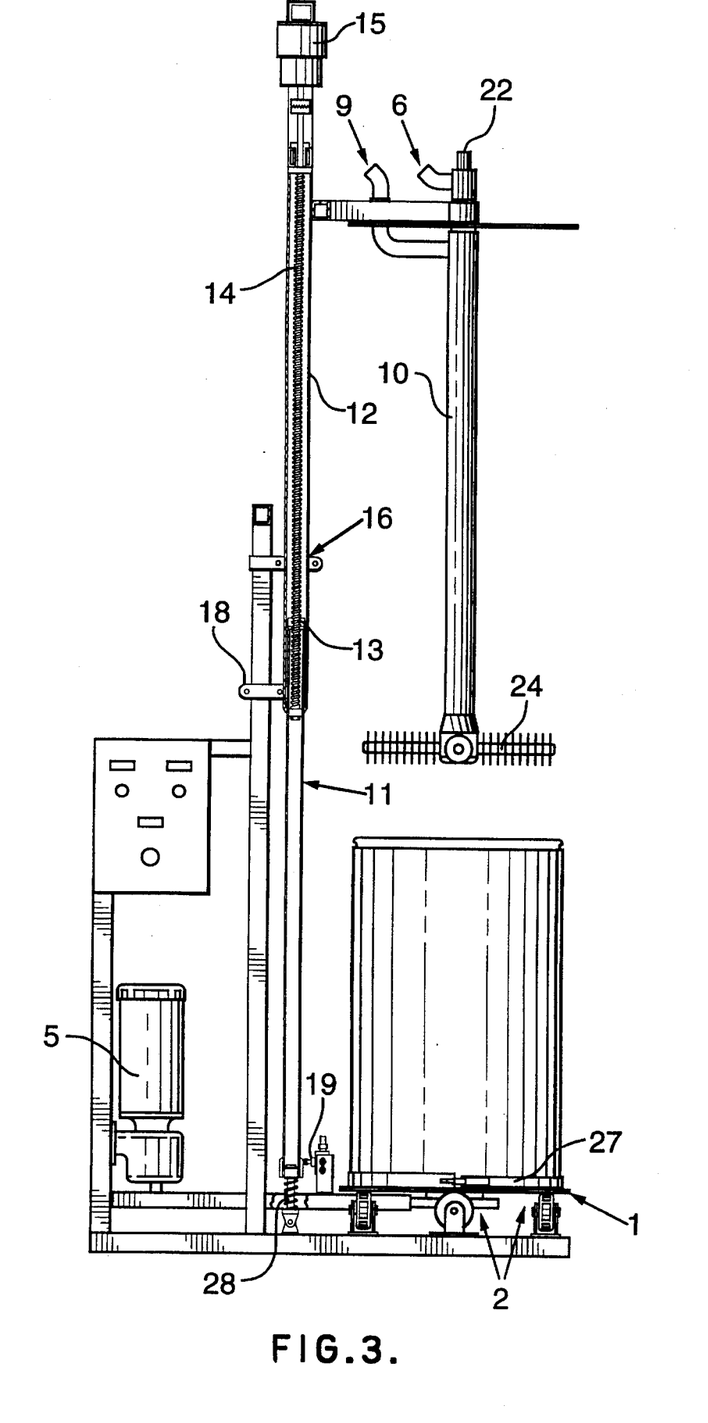
FIG. 3 is a side elevation view similar to FIG. 1, but in partial cross-section.
Figure 4:
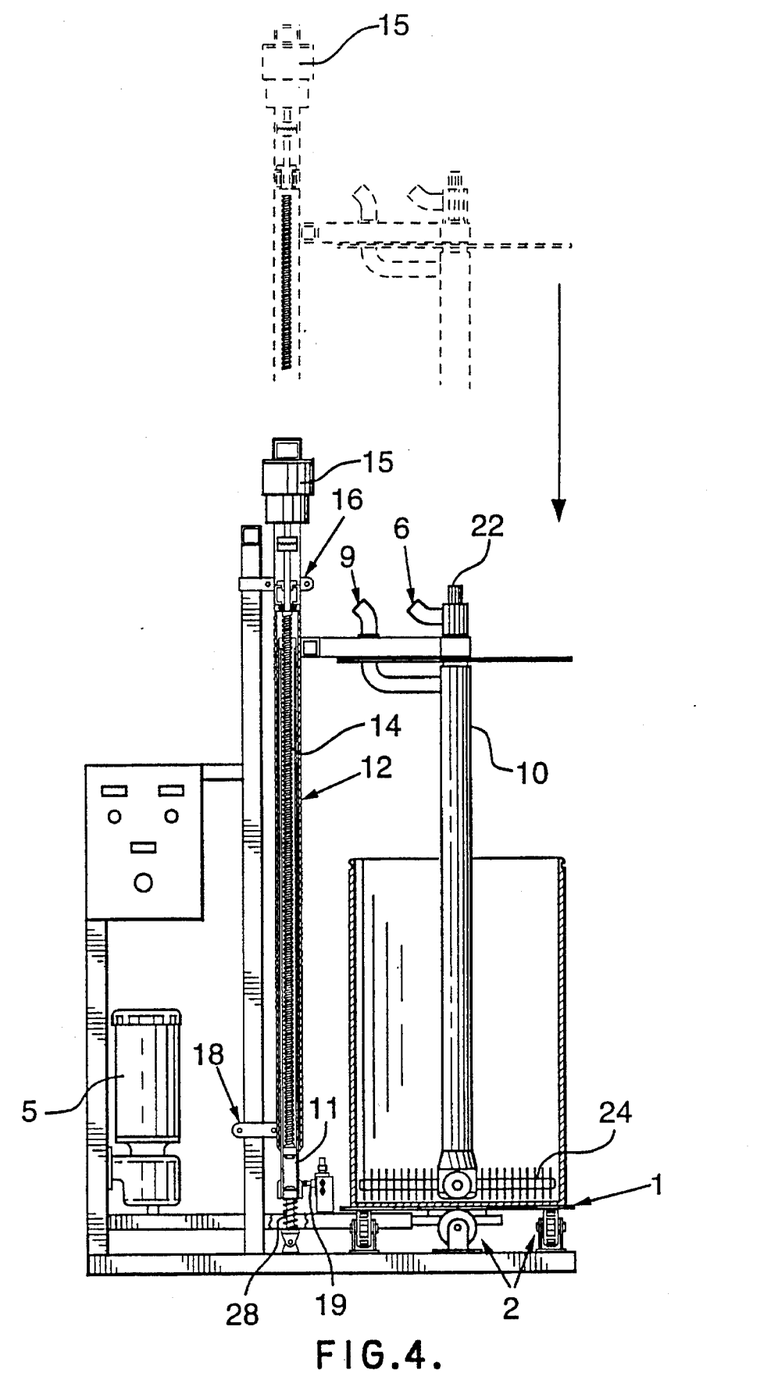
FIG. 4 is a side elevation view similar to FIG. 3, but with the heating element shown fully lowered.
Figure 5:
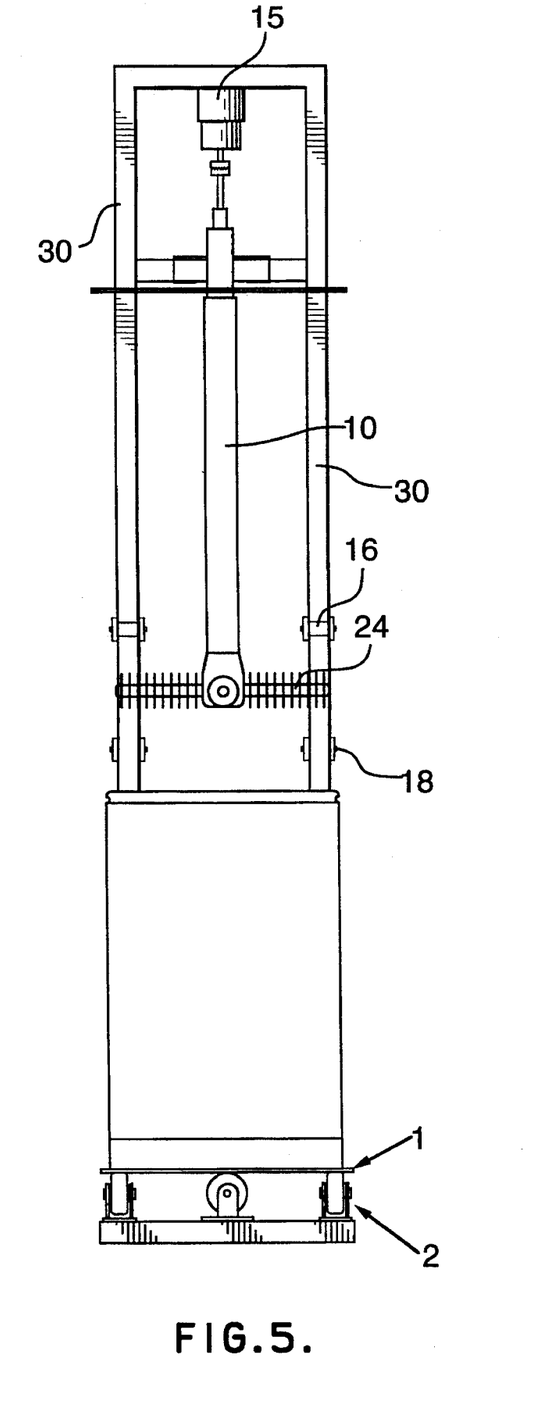
FIG. 5 is a front elevation view of the apparatus.
Figure 6:
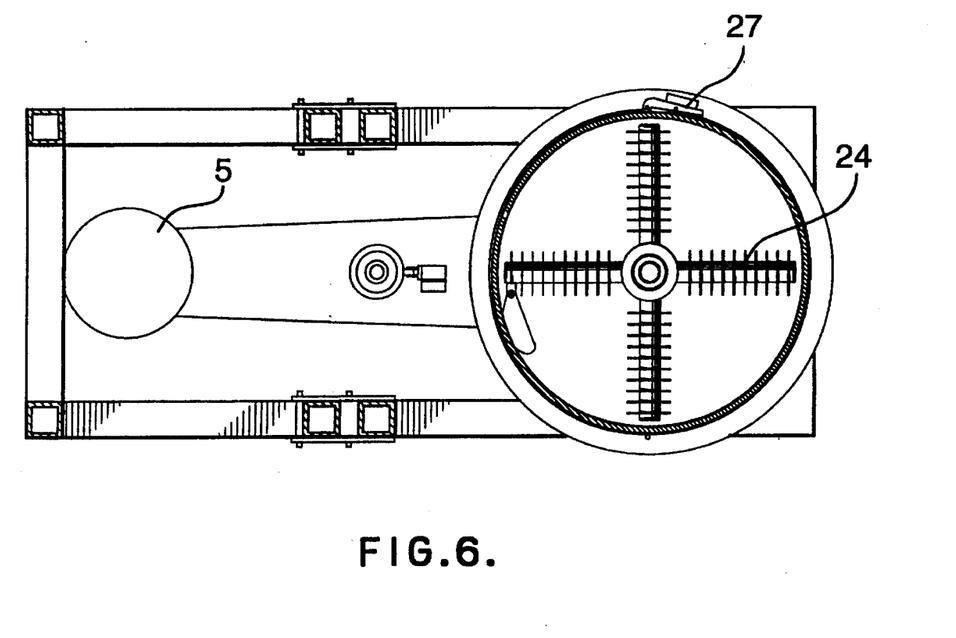
FIG. 6 is a cross-sectional plan view part way up the apparatus.
Figure 7:
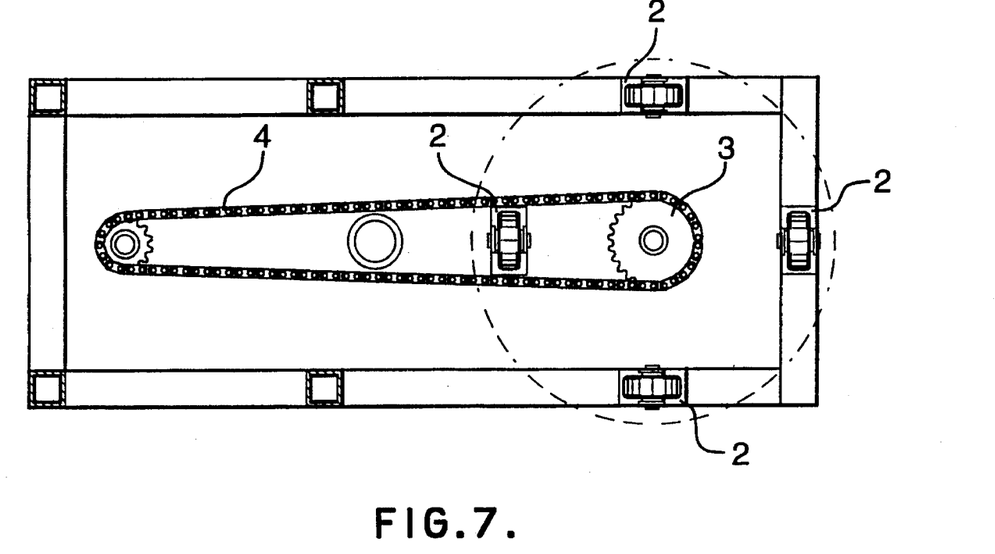
FIG. 7 is a cross-sectional plan view below the turntable.
Figure 8:
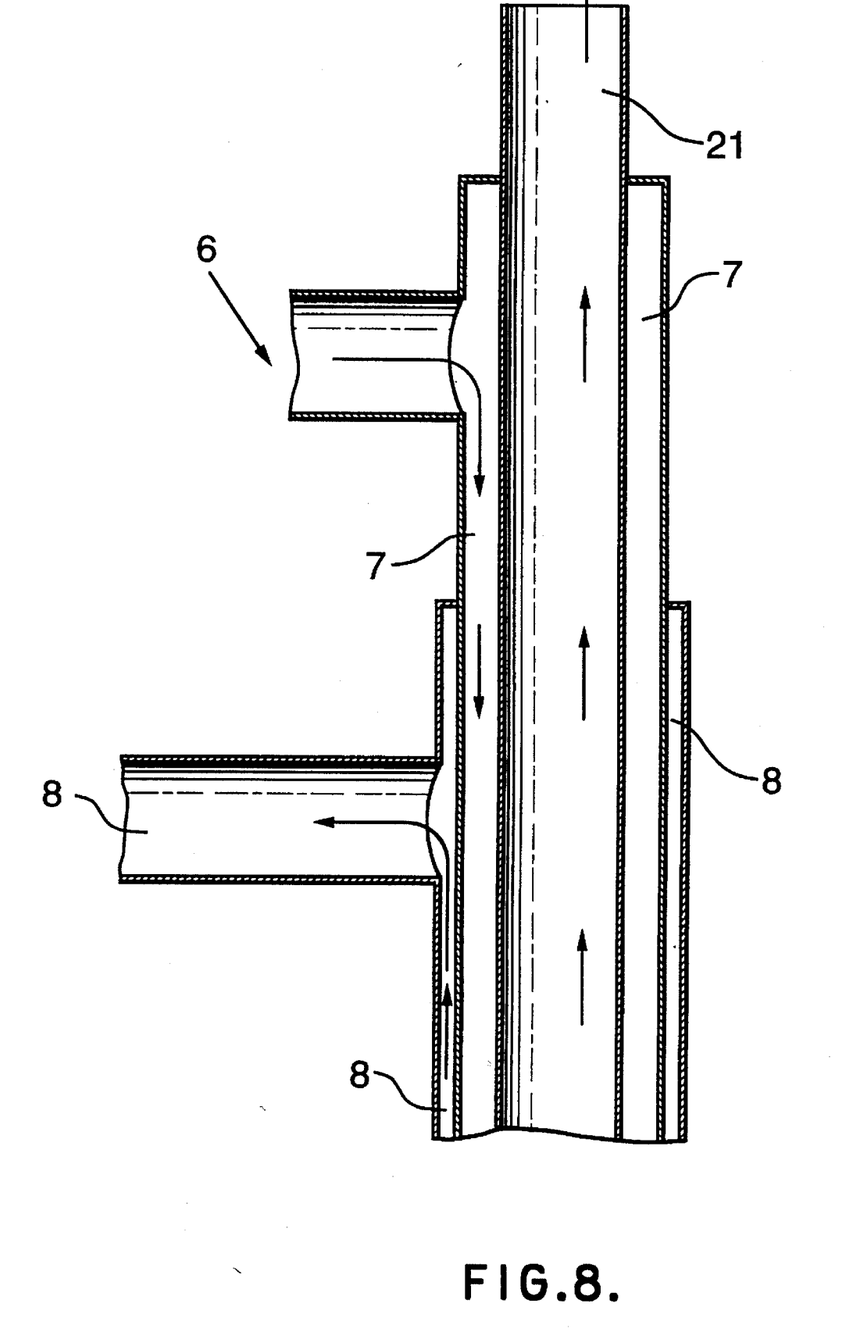
FIG. 8 is a cross-section of the mast.

Two sets of guide rollers keep the fixed and movable sections of the mast frame aligned. The upper set 16 is fastened to the fixed part of the supporting frame 17. The lower set 18 is fastened to the movable frame section.

Figure 17:
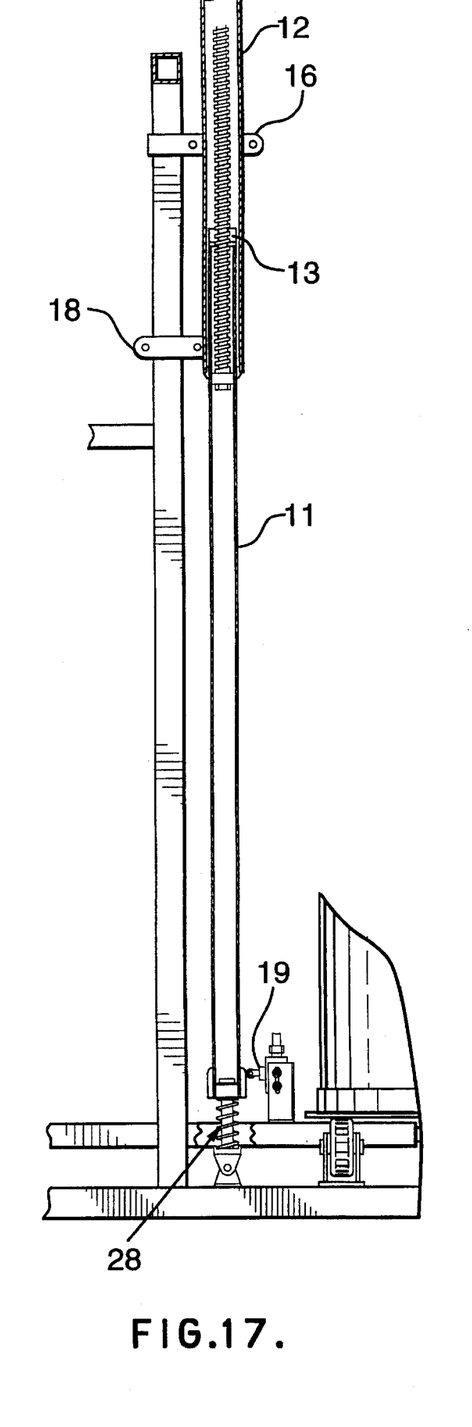
FIG. 17 is a side elevation view showing a spring-supported mast.
Figure 18:
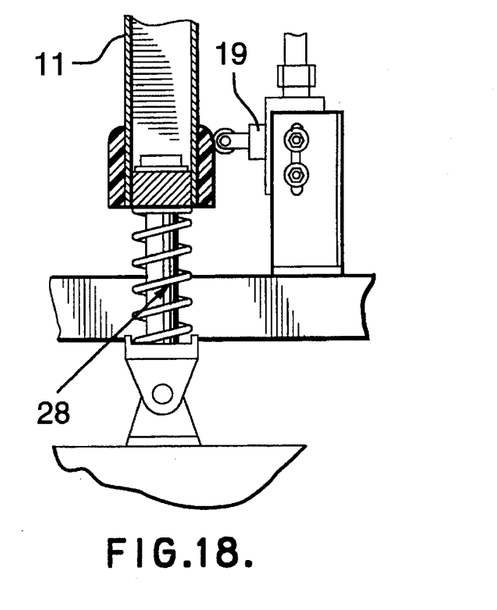
FIG. 18 shows the area of the spring of FIG. 17, with the mast in the position it would be in as the heating element comes into contact with hard product.
Figure 19:
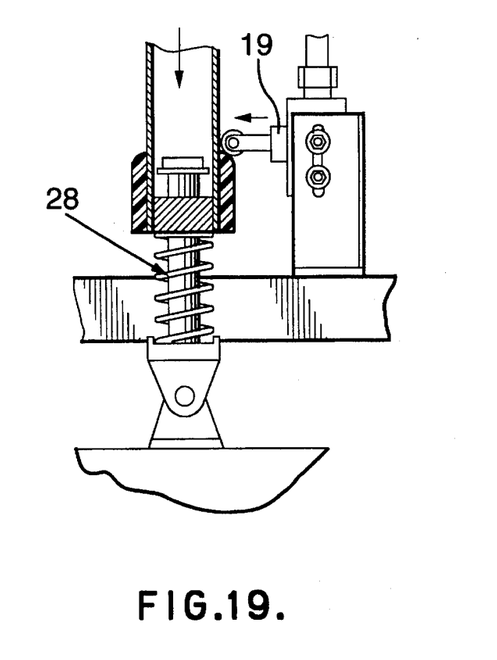
FIG. 19 shows the area of the spring of FIG. 17, with the mast in the position it would be in as the heating element softens the product, such that more of the weight of the mast and heating element bear down on the spring.

The lower fixed section 11 is supported by a spring 28 and when the heating element has softened some material in the container and thereby reduces the support under heating elements 24, provided by solid material, the whole assembly has a higher apparent weight and the spring is compressed. This compression activates microswitch 19 that starts the drive 15 to lower the whole assembly. In this way the heating elements are automatically lowered into the container, as the process of liquefaction proceeds.

In the example where a chocolate coating at 75° F. was heated with water at 149° F., it was found that the electric drive 15 rotated the threaded rod 14 about one to three turns every 5 to 10 seconds and lowered the heating element into the drum at a slow, controlled rate. The heating element reached the bottom of the drum in about ten minutes.

The inventors have found that they can partially liquify the chocolate so that it can be pumped, by heating it from 70° to 85° F. in ten minutes. At this time the chocolate was ready to be pumped out through the interior channel 21 that extends from product outlet 22 through the centre of the leg 10 that supports the heating elements and that is open at the bottom end. The chocolate still had a high viscosity due to the fact that only a portion of the fat fractions in the material was liquified, which was a requirement in this particular application.

Figure 15:
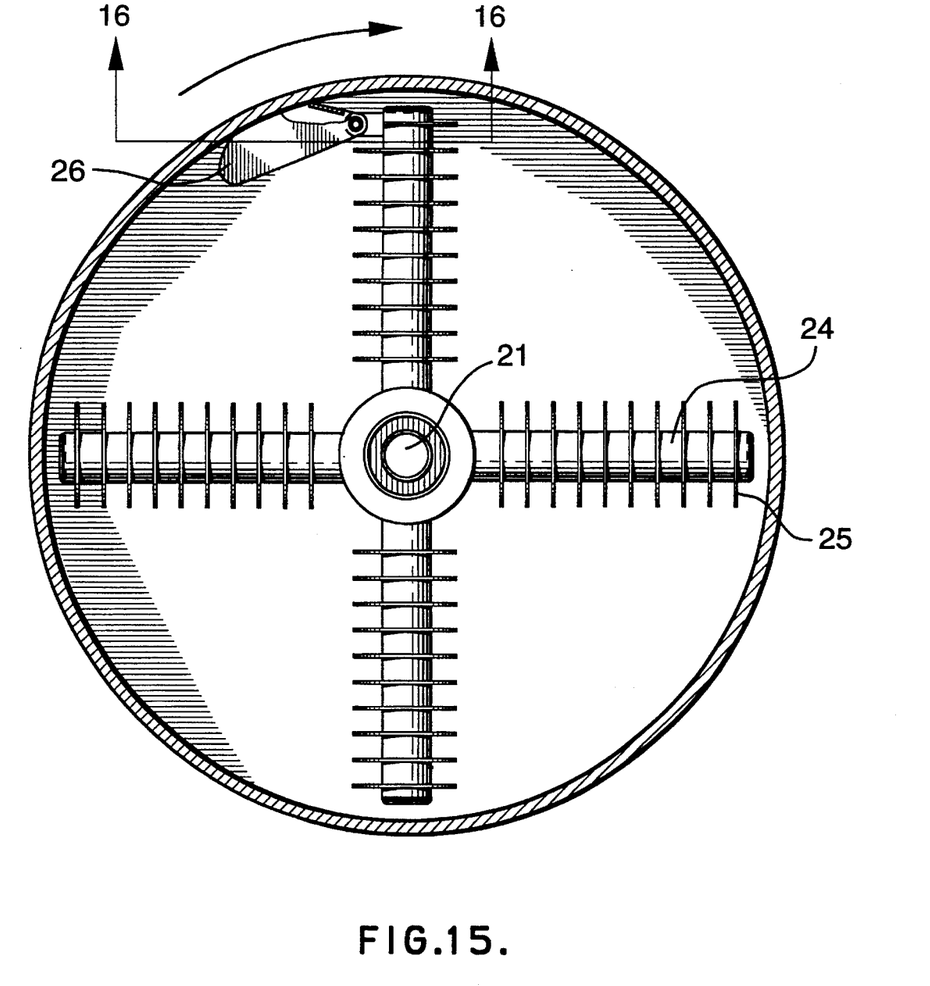
FIG. 15 is a plan view of the heating element in the drum.

Because most or all of the heat transfer takes place at the heating element that consists of crossed arms 24 that are equipped with a number of vanes 25 to increase the surface area of the elements, the transfer of heat mostly takes place in this leading plane.

The inventors describe this heating method as "progressive zone melting", a process whereby the heating element moves on through one zone to another once the desired amount of heat has been transferred. For many materials, the desired objective is to transfer a specific amount of heat and to avoid overheating any part of the material.

With the process and apparatus of the invention, no local overheating takes place, for three reasons. First, the temperature of the heating element is controlled by hot water that is pumped through the series of channels. The water temperature can be controlled accurately. Second, the element is only in contact with any portion of the material for a very short time because the rotation of the drum has the effect of moving the heated arms constantly through the material. Third, the material is not overheated because the agitator sinks into the drum and moves on to contact new material when the desired amount of heat has been transferred to the current layer in order to partially liquify it. This is how certain fractions of the fat in a chocolate coating can be melted, leaving the balance in the solid crystalline form to contribute to viscosity and texture.

An interesting application for this apparatus is a process where small amounts of ingredients, such as emulsifier, colours and flavours need to be added to a container of, for instance, a blend of hydrogenated vegetable oils. The oils can be liquified and the additional ingredients can then be added in the same container and as part of the same process. The finished product can be prepared in one container and made ready for shipment without ever leaving the container in which the main ingredient arrived in the plant. Additional equipment such as high speed mixers can be attached to the descending supporting leg 10 and can then be used to break up aggregates or emulsify a second ingredient into the material in the drum.

In a complete reversal of the process, this same equipment can also be used to cool hot liquid material in a cylindrical container. The cooling element would be lowered to the bottom of the container and cold water can be pumped through the channels. When the heat has been removed from the bottom layer, the element then moves up to contact a new layer of hot material.

This method of cooling has two advantages. It avoids the use of expensive heat exchangers to cool hot liquid materials and for many fat based materials that are inclined to supercool before they solidify, it is possible to cool the material below its melting point. When materials such as chocolate coatings are cooled below their melting point they become quite unstable and can suddenly solidify. Because the material is already in its shipping container and because solidification will not take place when the material is agitated, the cooling element will not become embedded in solid material and solidification takes place in the container and not in the heating exchanger.

It will be appreciated that the above description relates to the preferred embodiment by way of example only. Many variations on the invention will be obvious to those knowledgeable in the field, and such obvious variations are within the scope of the invention as described and claimed, whether or not expressly described. For example, the number, configuration and design of the heating elements can be varied, especially for different materials to be processed. Very hard materials, including frozen products with ice crystals, may require steel fingers or blades that break up the material to bring it into contact with the heating elements. Heating with steam, electrically generated heat and other heat sources clearly fall within the scope of the invention as well.

What is claimed as the invention is:

1. Apparatus for heating a viscous material in an open-topped cylindrical container, where heating reduces the viscosity of said material, thereby liquifying it, said apparatus comprising:

a platform rotatable about a vertical axis to rotate said container when placed coaxially on said platform;

a horizontally-oriented heating element mounted for vertical movement so as to be lowerable into and raisable from said container to apply heat to said material in a horizontal layer in the region of said heating element; and control means for gradually lowering said heating element through said material to heat progressively lower layers of said material within said container.

2. Apparatus as recited in claim 1, where said heating element vertical movement is effected by drive means arranged to move said element upwardly and downwardly on guide rollers along a fixed vertical frame.

3. Apparatus as recited in claim 1, where said heating element is heated by pumping a heat exchange medium through internal channels in said heating element.

4. Apparatus as recited in claim 1, where a vertical pipe supports said heating element, said heating element being disposed at a bottom end of said vertical pipe, said heating element comprising a cross of two pipes.

5. Apparatus as recited in claim 4, where said heating element is heated by pumping a heat exchange medium through internal channels in said heating element.

6. Apparatus as recited in claim 5, where said heating element is equipped with vanes projecting therefrom to increase the effective surface area and to thereby increase the rate of heat exchange.

7. Apparatus as recited in claim 1, where said heating element has jagged surfaces to break up solid materials.

8. Apparatus as recited in claim 1, where said heating element is equipped with mixing blades to mix the material after its viscosity has been reduced by heating.

9. Apparatus as recited in claim 4, where said vertical pipe is equipped with one or more open channels that are connectable to a pump to remove liquified material from the container.

10. Apparatus as recited in claim 1, where said heating element is equipped with one or more outlets that allow the addition of other liquid ingredients to the liquified material.

11. Apparatus as recited in claim 1, where said control means comprises means for measuring torque on said platform, the torque measurement being used to determine the rate of descent of the heating element into the material.

12. Apparatus as recited in claim 1, where said control means comprises means for measuring the downward force on the platform, the force measurement varying when the viscosity of the material changes, thereby triggering a switch that activates drive means to lower the heating element.

* * * * *